United States Patent [19]
Abell

[11] Patent Number: 5,282,356
[45] Date of Patent: Feb. 1, 1994

[54] FLYWHEEL ENGINE

[76] Inventor: Irwin R. Abell, 7360 Hwy. 95 South, Sandpoint, Id. 83864

[21] Appl. No.: 2,470

[22] Filed: Jan. 7, 1993

[51] Int. Cl.$^5$ .............................................. F02C 3/14
[52] U.S. Cl. ...................................... 60/39.35; 416/21
[58] Field of Search ........................... 60/39.34, 39.35; 416/20 R, 21; 74/572

[56] References Cited

U.S. PATENT DOCUMENTS

| | | | |
|---|---|---|---|
| 1,256,674 | 2/1918 | Fottinger | 60/39.35 |
| 2,465,856 | 3/1949 | Emigh . | |
| 2,474,685 | 6/1949 | McCollum . | |
| 2,679,295 | 5/1954 | Parsons . | |
| 2,895,259 | 7/1959 | Beckett . | |
| 2,927,647 | 3/1960 | Serriades . | |
| 3,484,172 | 12/1969 | Reed . | |
| 3,768,926 | 10/1973 | Pegg et al. . | |
| 3,804,549 | 4/1974 | Kellenbarger . | |
| 4,024,705 | 5/1977 | Hedrick . | |
| 4,413,860 | 11/1983 | Prescott | 74/572 |
| 4,538,079 | 8/1985 | Nakayama et al. | 74/572 |
| 4,590,761 | 5/1986 | Zettner | 60/39.34 |

Primary Examiner—Richard A. Bertsch
Assistant Examiner—William J. Wicker
Attorney, Agent, or Firm—Wells, St. John, Roberts, Gregory & Matkin

[57] ABSTRACT

A flywheel engine includes a flywheel body made up of laminated disks, pressed one into another on a central drive shaft. Individual ones of the disks are stamped with recesses which accommodate jet or rocket propulsion housings, electrical wiring, and fuel delivery passages. The propulsion housings are removably mounted in the flywheel body to permit interchange with other propulsion devices according to thrust requirements. The propulsion housings are oriented to produce thrust on thrust axes that are substantially tangential to the rotational path of the flywheel body edge surface. Fuel and combustion supporting oxygen are delivered to the individual propulsion housings through the central shaft.

18 Claims, 4 Drawing Sheets

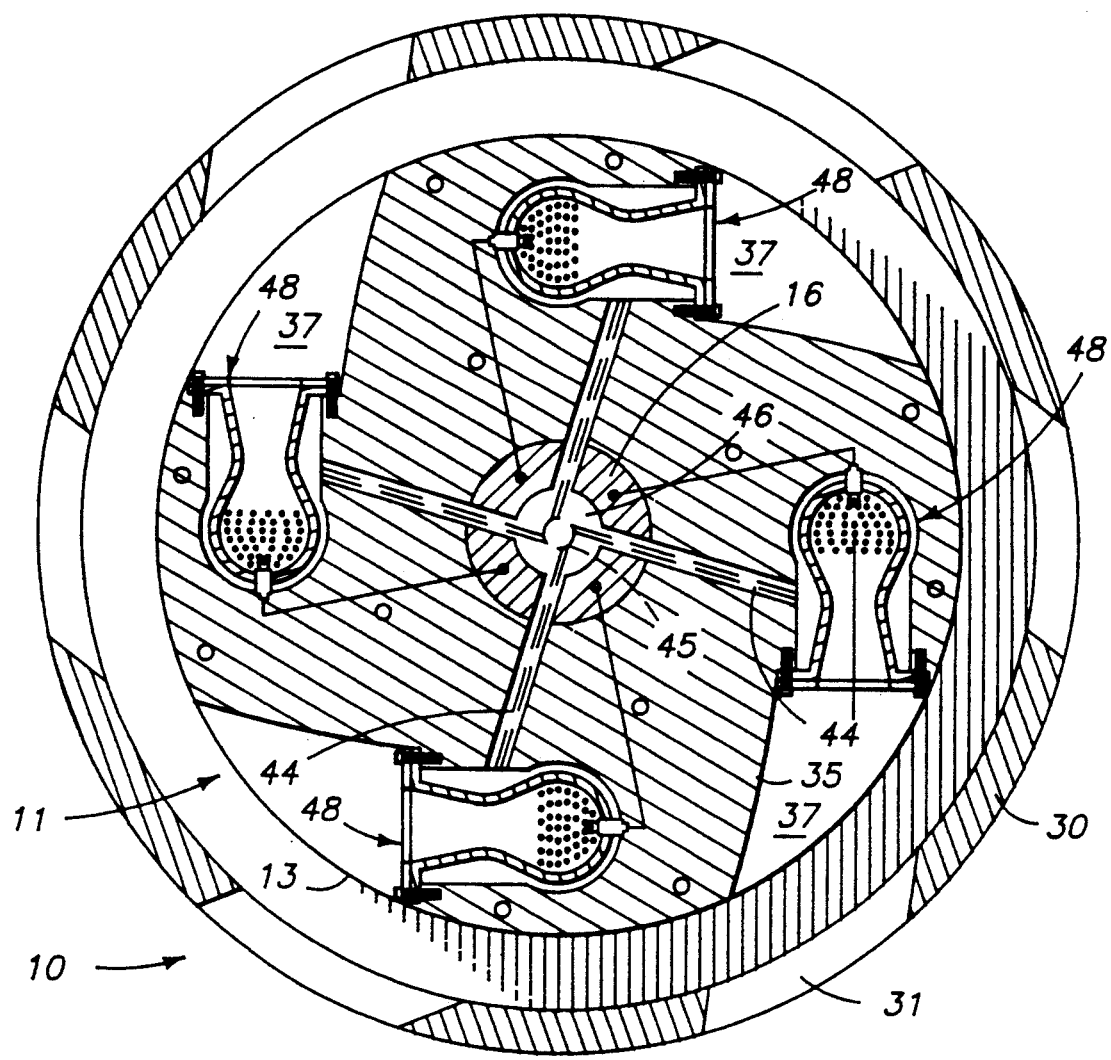
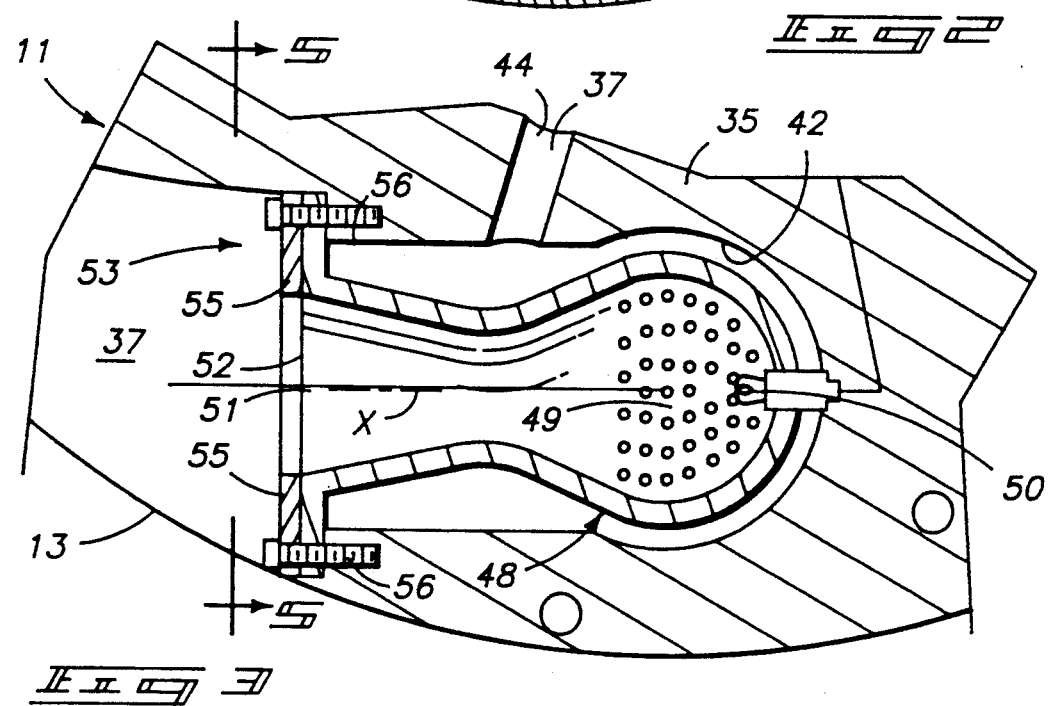

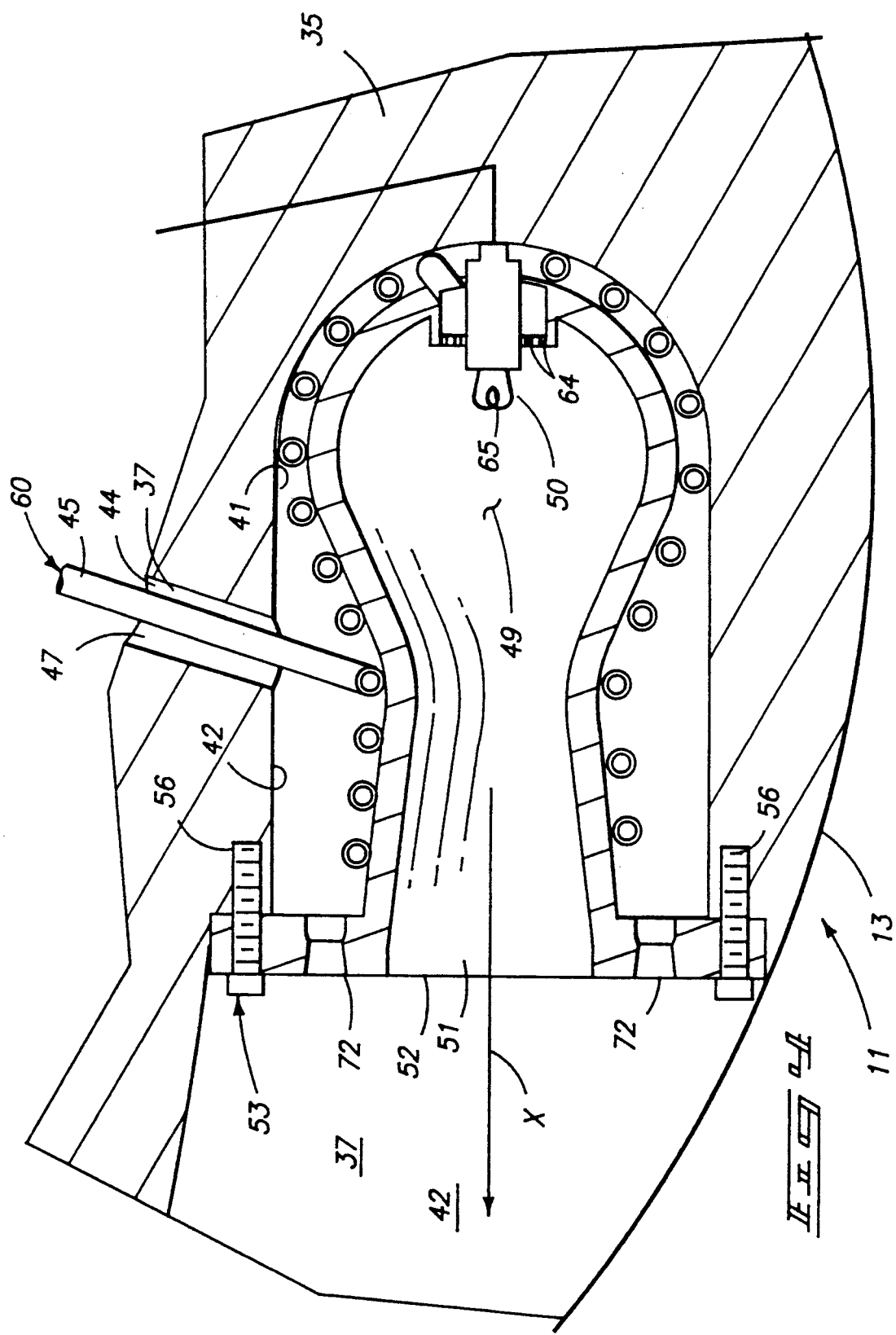

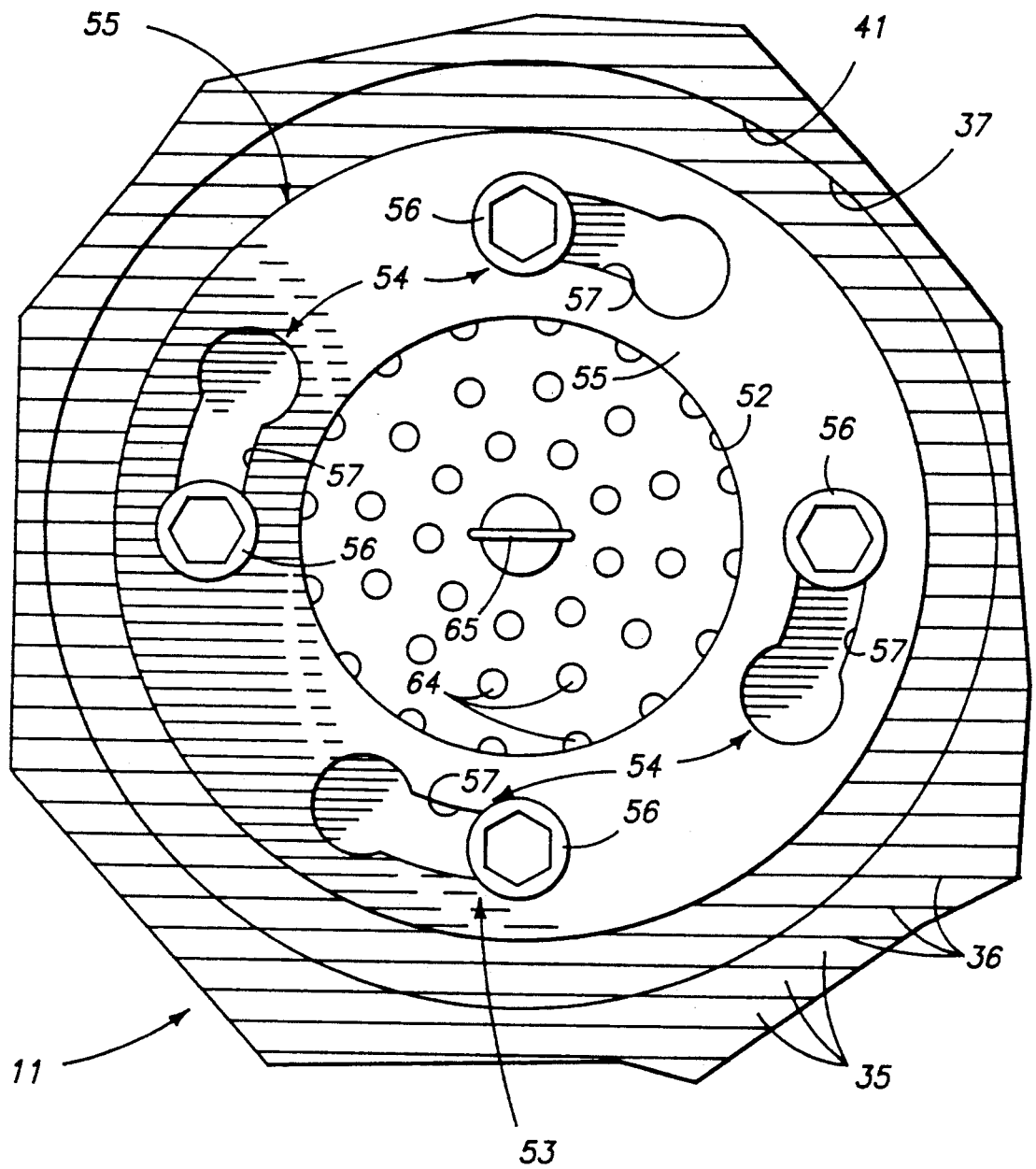

FLYWHEEL ENGINE

TECHNICAL FIELD

The present invention relates to engines, and more particularly to flywheel engines.

BACKGROUND OF THE INVENTION

The conventional internal combustion engine has been developed over the years to reach greater degrees of efficiency. However, the reciprocating piston engine is inherently inefficient due to the required reciprocating motion of the piston. The drive pistons are at rest and in a drag state for a significant portion of the stroke length, especially in four cycle, conventional automotive engines. A need has therefore existed for a more efficient engine.

Inherently efficient engines are the rocket engines currently in use for lifting huge payloads at extreme thrust and acceleration into orbit around the earth. The difficulty with jets and rockets in relation to land vehicles, however, is that they are reactive engines and work with thrust rather than compression and drive, and that a rocket is typically useful only for a short duration. Yet jet and rocket engines are significantly more efficient than internal combustion engines.

U.S. Pat. No. 3,804,549 to Kellenbarger discloses an internally propelled flywheel engine. The flywheel is driven by thrust from exhaust ports leading outwardly from ignition chambers formed within the flywheel body. The engine is arranged with valving such that the exhaust gases are not constantly vented but are valved, as are intake and ignition portions of the operational cycle. It is also stated that this engine may make use of external combustion with pressurized gases being delivered through piping to various exhaust jets for the purpose of forcibly rotating the flywheel.

While greater efficiency may be available in the Kellenbarger engine, there remains a need for an engine using thrust or jet thrust for driving a flywheel that is efficient in construction and that may be easily adapted for different driving requirements, and in which the immediate reactionary forces may be instantaneously realized at the perimeter of the flywheel, thereby maximizing the operational efficiency.

It is a primary object of the present invention to introduce advanced technologies used in space industry, into practical domestic industrial applications, in a unique jet propulsion driven flywheel engine. The above and still further objects and advantages of the present engine will become more apparent upon reading the following description which, taken with the accompanying drawings, disclose preferred embodiments of the present invention.

BRIEF DESCRIPTION OF THE DRAWINGS

Preferred and alternate embodiments of the present invention are illustrated in the accompanying drawings in which:

FIG. 2 is a sectional view of the first preferred form of the invention;

FIG. 3 is an enlarged fragmented detail showing a first preferred propulsion housing;

FIG. 4 is an enlarged sectional view of an alternate propulsion housing and fuel supply; and FIG. 5 is an enlarged view taken substantially along line 5—5 in FIG. 3.

DETAILED DESCRIPTION OF THE PREFERRED EMBODIMENTS

Figure 1:
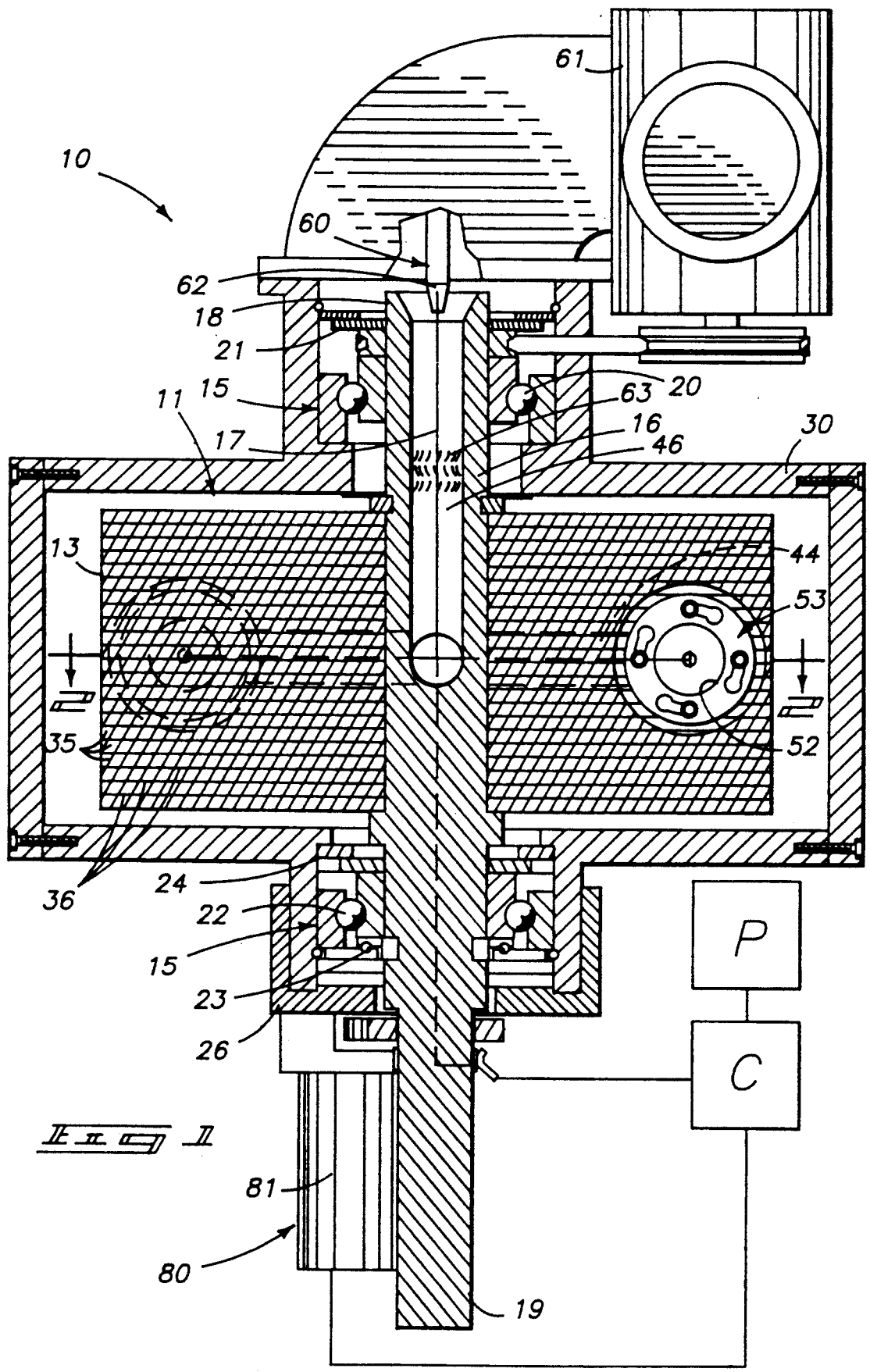
FIG. 1 is a longitudinal sectional view taken through a first preferred form of the present engine, with portions thereof shown diagrammatically.

This disclosure of the invention is submitted in furtherance of the constitutional purposes of the U.S. Patent Laws "to promote the progress of science and useful arts" (Article 1, Section 8).

A flywheel engine embodying features of the present invention is illustrated in the accompanying drawings and is generally designated by the reference numeral 10. The flywheel engine 10 includes an internal laminated flywheel body 11 having a substantially circular peripheral edge surface 13. Means is provided at 15 mounting the flywheel body for rotation about the rotational flywheel axis 17. Means 15 includes a central elongated shaft 16 extending from a top end 18 to a bottom output shaft end 19. The top end of the shaft is rotatably journaled by top bearings 20 and top seals 21 seal the bearing area in relation to the housing 30 that encloses the flywheel body and rotatably mounts the shaft.

Bottom bearings 22 are also provided to rotatably journal the bottom shaft end. The bottom bearings 22 cooperate with bottom thrust bearings 23 to rotatably journal and provide elevational support to the shaft and the heavy flywheel body mounted thereon. Bottom seals 24 are also provided between the bearings and housing 30 to protect the bearings from the external environment. It should be understood that the bearings and seals may be standard conventional bearing members and will therefore not be described in great detail herein.

Bottom seals 24 are mounted on an engine support bracket 26 that is, in turn, bolted or otherwise releasably secured to the engine housing 30.

The stationary engine housing encloses the entire flywheel body 11 within its confines to protect the balanced components within the housing and to provide a controlled exhaust opening 31 for discharging exhaust from the propulsion housing and flywheel body. The exhaust opening may be one or several leading from the housing. These openings may, in turn, lead to substantially conventional exhaust collection mechanisms (not shown) for delivering the exhaust gases to a final discharge port.

The flywheel body 11 is made up of many laminations formed by disks 35. The laminated disks 35 include adjoining planar surfaces that are substantially perpendicular to the flywheel axis. The disks 35 are formed preferably of stamped metal such as the form of steel commonly used for producing flywheel weights used in gyroscopic instrumentation and guidance systems. Laminated disks 35 are individually stamped or otherwise formed and press fitted together with adjoining planar surfaces 36 substantially perpendicular to the flywheel axis 17. Each disk is cut out in appropriate areas 37 to form recesses for receiving or mounting various driving, cooling, ignition, and fuel delivery components. As shown in FIGS. 1 and 2, the disks may also be held together with pressure rivets extending axially through the flywheel body.

The disks used to comprise the flywheel body will of necessity be prepunched or otherwise shaped prior to being pressed onto the central shaft 16. The flywheel turning at enormous rpm will cause internal magnetism and stresses that would cause a solid block of metal to explode. By providing a laminated flywheel body, two problems are solved. No drilling or grinding will be required for making the various cavities and passageways formed into the flywheel body. Additionally, laminating will overcome internal magnetism and metal stress. Manufacturing costs and time will therefore be minimized.

The disks are individually stamped with progressive recess areas to produce a formed internal wall surface 41 (FIG. 4) that define nonradial recesses 42 (FIG. 4) as a cooling chamber within the flywheel body. Each cooling chamber 42 is angularly oriented with respect to the central rotational axis 17 (FIG. 1) and leads to an opening along the peripheral edge surface of the flywheel body. It is preferred that several of the recesses be formed within the flywheel body at equiangularly spaced positions about the rotational axis 17. The cut out areas 37 also form coolant and fuel delivery ducts 44 (FIG. 2) formed within the flywheel body and openly communicating with the nonradial recesses formed therein.

The coolant delivery ducts 44 openly communicate with a coolant and fuel delivery bore 46 formed within the shaft. In the first preferred form, the fuel for the engine is also utilized as the coolant. Therefore, the delivery ducts 44 and 46 also function as the fuel delivery ducts. In an alternate form (FIG. 4), water is used as the coolant. Therefore, individual coolant delivery ducts 47 are provided separately from fuel delivery ducts 45.

Each of the nonradial recesses 42 receives and mounts a propulsion housing 48 (FIG. 2). The propulsion housings 48 are releasably mounted to the flywheel body 11 to facilitate removal for maintenance, as well as enabling interchange of various forms of propulsion housings to vary the torque and power characteristics of the engine. This is an important feature, providing the same basic engine components throughout, while providing a great variation in performance characteristics simply by providing the capability to selectively interchange propulsion housings within the engine.

It is well known that various propulsion housings, due to housing configuration, will produce varying thrust pressures. This is a factor of the propulsion housing configuration and size. With the nonradial recesses 42 configured to receive a number of different sized propulsion housings, changing engine performance characteristics may be significantly simplified over conventional internal combustion engines. This feature therefore significantly reduces manufacturing costs by facilitating construction of the single engine flywheel body, engine compartment, central shaft, and other components that may be used universally.

A propulsion housing 48 is shown in alternate embodiments in the drawings. It should be understood that the housings 48 make use of standard jet propulsion and rocket design principles. Details of construction for the housing, relating to the nozzle characteristics, will therefore not be presented for the purpose of brevity. It is sufficient to indicate the individual housings each include a combustion chamber 49 formed within the housing body and a fuel combustion means 50 for igniting the fuel within the individual chambers 49. A discharge nozzle 51 communicates with the combustion chamber and leads to an external opening 52 (FIG. 5) defining an exhaust thrust axis "X".

More specifically, provision is made for mounting the individual propulsion housing 48 within the flywheel body such that the exhaust thrust axes "X" are substantially tangential in relation to the circular path or rotational path of the flywheel body as it rotates. Thus, the propulsion housings and discharges are arranged in effect, such that the exhaust axes are substantially perpendicular to radial planes from the central rotational axis 17.

The propulsion housings 48 are mounted in the above desired orientations by bracket means 53. Bracket means 53 is provided for releasably mounting the propulsion housings within the nonradial recesses 42 and with the exhaust thrust axis oriented in the above-described relationship to the rotational direction of the flywheel body 11.

In a first preferred form, the bracket means 53 includes a bayonet mounting means 54 on the propulsion housing in communication with a mounting ring 55 on each of the propulsion housings adjacent the exhaust opening thereof. A bayonet mounting means (FIG. 5) may include headed fasteners 56 threadably secured to the flywheel body 11 with the headed ends received through bayonet mounting slots 57 on the mounting rings 55. The headed ends will be received through enlarged portions of the mounting slots 57 and the threaded portions received within narrower portions of the slots upon rotation of the propulsion housing 48. The individual housings 48 may thus be secured simply by tightening the headed fasteners 56. This provision facilitates fast and simple interchangeability of various propulsion housing 48, having different thrust characteristics.

A supply means is generally shown at 60 (FIG. 4) for delivering combustible fuel to the propulsion housing. The supply means may include relatively conventional fuel supply component parts, including a blower 61 (FIG. 1) for forcibly supplying air to the fuel supply means, and a fuel jet 62 for providing liquid fuel to the compressed air moving through the supply means to the various propulsion housings. The fuel jet 62 may be a conventional atomizer type nozzle, and as such, may also be provided for ease and interchangeability simply by replacing the nozzle structure with flow characteristics commensurate with the fuel demand of the collective propulsion housings within the engine. Downstream of the fuel jet 62 are a plurality of fuel/air mixing fins 63. These fins 63 are mounted to and rotate with the central shaft 16 and therefore will spin with the shaft. The fins 63 resemble turbine compression fins with alternating fin orientations to progressively homogenize the mixture of fuel and air.

It is intended that the present engine operate on numerous fuels and fuel mixtures. However, it is preferable that hydrocarbon fuel (gasoline) currently in use will be the preferred fuel component due to the current availability and known, readily available distribution channels. Fuel and air mixture, due to the use of the preferred air supply means and the fuel/air mixing fins 63, produce a molecular diffusion of fuel and air to a state sufficient to enable near stoichiometric combustion within the propulsion housing combustion chambers 49. Appropriate air-fuel mixture diffusion will create a flame front at approximately 4,300 feet per second with the vapor burning at approximately 3,500 degrees F. An attainable volumetric air-to-fuel ratio of approximately 53 to 1 produced through the forced air induction and nozzle relationship, will facilitate the near stoichiometric combustion.

Additionally, the fuel-air mixture is progressively heated by the heat of combustion within the propulsion housings. Air and fuel entering into the nonradial recesses 42 is immediately exposed to the propulsion housing 48. The air and fuel mixture surrounds the propulsion housing and is heated by the housing before being forced through inlet openings 64 into the housing. The air-fuel mixture is then ignited by a conventional plug ignition system 65. It is pointed out that the igniter plugs 65 may be mounted directly to the propulsion housing 48 and may therefore be easily accessed simply by removing the plugs from the associated propulsion housings through the associated nonradial recesses 42. Electrical energy for operating the igniter plugs 65 may be supplied through conventional slip ring arrangements to a conventional source of electrical energy P (FIG. 1), by standard battery and generating or alternator forms of ignition energy supplies as are conventionally known. Power is supplied through a control system C (FIG. 1) that also may involve conventional equipment and design techniques well within the skill of ignition and control designers.

The ignition system used for the present engine will be simplified in the sense that igniter plugs are used. Thus, there is no requirement for repeated, timed firing of the individual plugs. The igniter plugs may be turned on and left on throughout operation of the engine. Electricity to operate the igniter plugs may be delivered through conventional wiring conduit formed, as other recesses indicated above, by the stamping or forming process for the individual disks.

FIG. 4 shows an alternate propulsion housing and cooling system in which water is used to cool the propulsion housing. In this instance, water used as a coolant is heated by the propulsion housing and converted to steam. This steam causes pressure within the cooling chamber between the propulsion housing and the formed internal wall surface 41 of the flywheel body. Water ejection nozzles 72 are provided about the perimeter of the propulsion housing exhaust opening to further contribute to the thrust provided through fuel combustion within the housing. The propulsion housing, coolant and fuel arrangement shown in FIG. 4 also may be provided in rocket form of a type known in rocket technologies.

It is intended that the above description be provided as an example of a preferred form of the invention with alternate configurations relating to the propulsion devices disclosed as exemplary propulsion units. Other features may also be altered. For example, a conventional exhaust driven turbine might well be utilized in place of the conventional blower discussed herein. Such a turbine would be driven by exhaust gases in the manner of conventional turbines using exhaust gases from internal combustion engines, to supply air under pressure to the fuel/air supply. It is also conceivable that the propulsion devices be rockets and that various other fuels might be used in the propulsion process.

Operation of the invention begins with the starting procedures which, depending upon the initial size of the flywheel body, may be initiated by a starting system 80. Such starting system may involve use of an electric starting motor 81 releasably connected to the shaft 16 for initially overcoming inertia of the stationary flywheel body and beginning rotation thereof to a starting speed. At this time, the air and fuel supply will become operational and ignition may be initiated to shift driving forces from the starting components to the propulsion housings 48.

Pressurized air and fuel will be received through the fuel supply into the propulsion housings through the appropriate apertures formed through the forward ends of the propulsion housings 48.

The active igniter plugs 65 (FIG. 4) will ignite the fuel and air mixture, causing combustion and extremely rapid expansion of the gases which, in turn, will be expelled through the nozzles 51. A controlled thrust is thus exerted on the flywheel body to increase the rpm.

The speed of rotation will increase until a maximum desirable rpm of approximately 30,000 is reached. The rockets or jet propulsion units will then be fired only intermittently to maintain the rpm within a preferred selected operational range depending upon the torque demanded and the diameter of the flywheel body. A preferred range for a body having a diameter of approximately 36 inches would be between 15,000 and 20,00 rpm. The control system C may be provided responsive to tachometer input to selectively operate the propulsion units according to the desired optimum rotational rpm range. Frequency of operation for the propulsion units will, of course, increase with increased load or resistance applied to the output of the central shaft 16. Such controls are well within the ordinary skill of engine ignition system designers.

Energy from the thrust of the propulsion units is stored in the form of kinetic energy in the rotating flywheel body. The mass of the body rotating at high speed represents a substantial amount of stored kinetic energy that may be converted to purposes of driving various forms of vehicles.

An additional advantage of the flywheel mechanism is the stabilization or gyroscopic effect that the rotating flywheel body has. This can be used to horizontally stabilize vehicles such as automobiles for purposes in cornering.

A further advantage is in ease of adapting the engine with very similar components for different needs. A lighter flywheel body may be used for high rpm, quick torque needs, where heavier flywheel bodies may be selected for storing kinetic energy for greater torque demands. Different uses will dictate the design, while the basic components will remain the same.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:
1. A flywheel engine, comprising:
 a flywheel body including a peripheral edge surface formed about a flywheel axis and including a formed internal wall surface defining a non-radial recess in the flywheel body and opening along the peripheral edge surface;
 means mounting the flywheel body for rotation about the flywheel axis such that the peripheral edge surface follows a circular path about the flywheel axis;

a propulsion housing including a combustion chamber;

supply means for delivering a combustible fuel to the propulsion housing;

fuel combustion means for igniting the fuel within the combustion chamber of the propulsion housing;

wherein the propulsion housing includes a nozzle communicating with the combustion chamber and leading to an opening defining an exhaust thrust axis along which exhaust is discharged from the combustion chamber; and bracket means for releasably mounting the propulsion housing within the flywheel body recess with the exhaust thrust axis substantially tangential to the circular path of the flywheel edge surface and wherein the flywheel body includes propulsion housing cooling means for guiding fuel around the propulsion housing to cool the housing during use.

2. A flywheel engine, as claimed by claim 1 wherein the flywheel body includes propulsion housing cooling means for guiding water around the propulsion housing to cool the housing and produce steam during use; and further comprising a steam ejection nozzle means on the bracket means for discharging steam from the cooling means substantially tangentially to the circular path of the flywheel edge surface.

3. A flywheel engine, as claimed in claim 1 further comprising a cooling chamber defined by the propulsion housing and the internal wall surface of the flywheel body, and wherein the supply means includes a fuel delivery duct formed within the flywheel body and openly communicating with the cooling chamber.

4. A flywheel engine, as claimed by claim 1, further comprising:
a cooling chamber defined by the propulsion housing and the internal wall surface of the flywheel body;
a coolant delivery duct formed within the flywheel body and openly communicating with the cooling chamber; and
wherein the bracket means includes nozzle means for discharging coolant in a direction substantially tangential to the circular path of the flywheel edge surface.

5. A flywheel engine, as claimed by claim 1 wherein the bracket means includes a bayonet mounting means on the propulsion housing for releasably locking the propulsion housing within the non radial recess.

6. A flywheel engine, as claimed by claim 1 wherein the flywheel body is formed by laminated disks, with laminations including adjoining planar surfaces substantially perpendicular to the flywheel axis.

7. A flywheel engine, as claimed by claim 1 wherein the flywheel body is formed of laminated metal disks.

8. A flywheel engine, as claimed by claim 1, wherein the flywheel body is formed of laminated metal disks, with individual disks defining cut out areas to form the non-radial recess.

9. A flywheel engine, comprising:
a flywheel body including a peripheral edge surface formed about a flywheel axis and including a formed internal wall surface defining a non-radial recess in the flywheel body and opening along the peripheral edge surface;
means mounting the flywheel body for rotation about the flywheel axis such that the peripheral edge surface follows a circular path about the flywheel axis;

a propulsion housing including a combustion chamber;

supply means for delivering a combustible fuel to the propulsion housing;

fuel combustion means for igniting the fuel within the combustion chamber of the propulsion housing;

wherein the propulsion housing includes a nozzle communicating with the combustion chamber and leading to an opening defining an exhaust thrust axis along which exhaust is discharged from the combustion chamber; and bracket means for releasably mounting the propulsion housing within the flywheel body recess with the exhaust thrust axis substantially tangential to the circular path of the flywheel edge surface; and wherein the bracket means includes a mounting ring on the propulsion housing adjacent the exhaust opening, and a fastener for releasably securing the mounting ring to the flywheel body.

10. A flywheel engine, as claimed by claim 1 wherein the bracket means includes a mounting ring on the propulsion housing adjacent the exhaust opening with a bayonet mount slot formed therein, and a headed fastener mounted to the flywheel body adjacent the opening of the non-radial recess receivable in the bayonet mount slot for releasably securing the mounting ring to the flywheel body.

11. A flywheel engine, as claimed by claim 1 wherein the bracket means includes a threaded mounting ring on the propulsion housing adjacent the exhaust opening, and wherein the flywheel body includes threads for releasably receiving the threaded mounting ring.

12. A flywheel engine, as claimed by claim 1 wherein said means mounting the flywheel body is comprised of:
a shaft mounting the flywheel body, centered on the flywheel axis; and
a housing enclosing the flywheel body and rotatably mounting said shaft and flywheel body within the housing and including an exhaust opening for discharging exhaust from the propulsion housing.

13. A flywheel engine, comprising:
a flywheel body including a circular peripheral edge surface formed about a flywheel axis and including a formed internal wall surface defining a non-radial recess within the flywheel body and an opening along the peripheral edge surface;
means mounting the flywheel body for rotation about the flywheel axis such that the peripheral edge surface follows a circular path about the flywheel axis;
a propulsion housing including a combustion chamber for producing an exhaust thrust, mounted within said non-radial recess and including a nozzle oriented to the direct exhaust thrust along an exhaust thrust axis that is substantially tangential to the circular path of the flywheel edge surface;
supply means for delivering a combustible fuel to the propulsion housing; and
fuel combustion means for igniting the fuel within the combustion chamber of the propulsion housing, and a cooling chamber defined by the propulsion housing and the internal wall surface of the flywheel body, and wherein the supply means includes a fuel delivery duct formed within the flywheel body and openly communicating with the cooling chamber.

14. A flywheel engine, as claimed by claim 13 wherein the flywheel body is formed of laminated metal disks.

15. A flywheel engine, as claimed by claim 13 wherein the flywheel body is formed of laminated metal disks and wherein the non-radial recess is defined by cut-out areas formed within individual metal disks.

16. A flywheel engine, as claimed by claim 13 wherein the flywheel body is formed of laminated metal disks and wherein the non-radial recess is defined by cut-out areas formed within individual metal disks; and wherein the disks are held together in stacked relation by pressure rivets extending axially through the flywheel body.

17. A flywheel engine, comprising:
a flywheel body formed of laminated metal disks including a smooth continuous circular peripheral edge surface formed about a flywheel axis and a formed internal wall surface defined by individual cut-out areas in the laminated metal disks and forming equiangularly spaced non-radial recesses in the flywheel body with each non radial recess including an opening along the circular peripheral edge surface;
means mounting the flywheel body for rotation about the flywheel axis such that the circular peripheral edge surface follows a circular path about the flywheel axis;
a propulsion housing in each non-radial recess, including a combustion chamber for producing an exhaust thrust, mounted within said non-radial recess and including a nozzle oriented to the direct exhaust thrust outward of the flywheel body and through the opening along an exhaust thrust axis that is substantially tangential to the circular path and the circular peripheral flywheel edge surface;
supply means for delivering a combustible fuel to the propulsion housings;
fuel combustion means for igniting the fuel within the combustion chambers of the propulsion housings.

18. A flywheel engine, as claimed by claim 17 further comprising:
bracket means for releasably mounting the propulsion housings within the flywheel body recesses with the exhaust thrust axes thereof substantially tangential to the circular path of the flywheel edge surface.

* * * * *